UNITED STATES PATENT OFFICE.

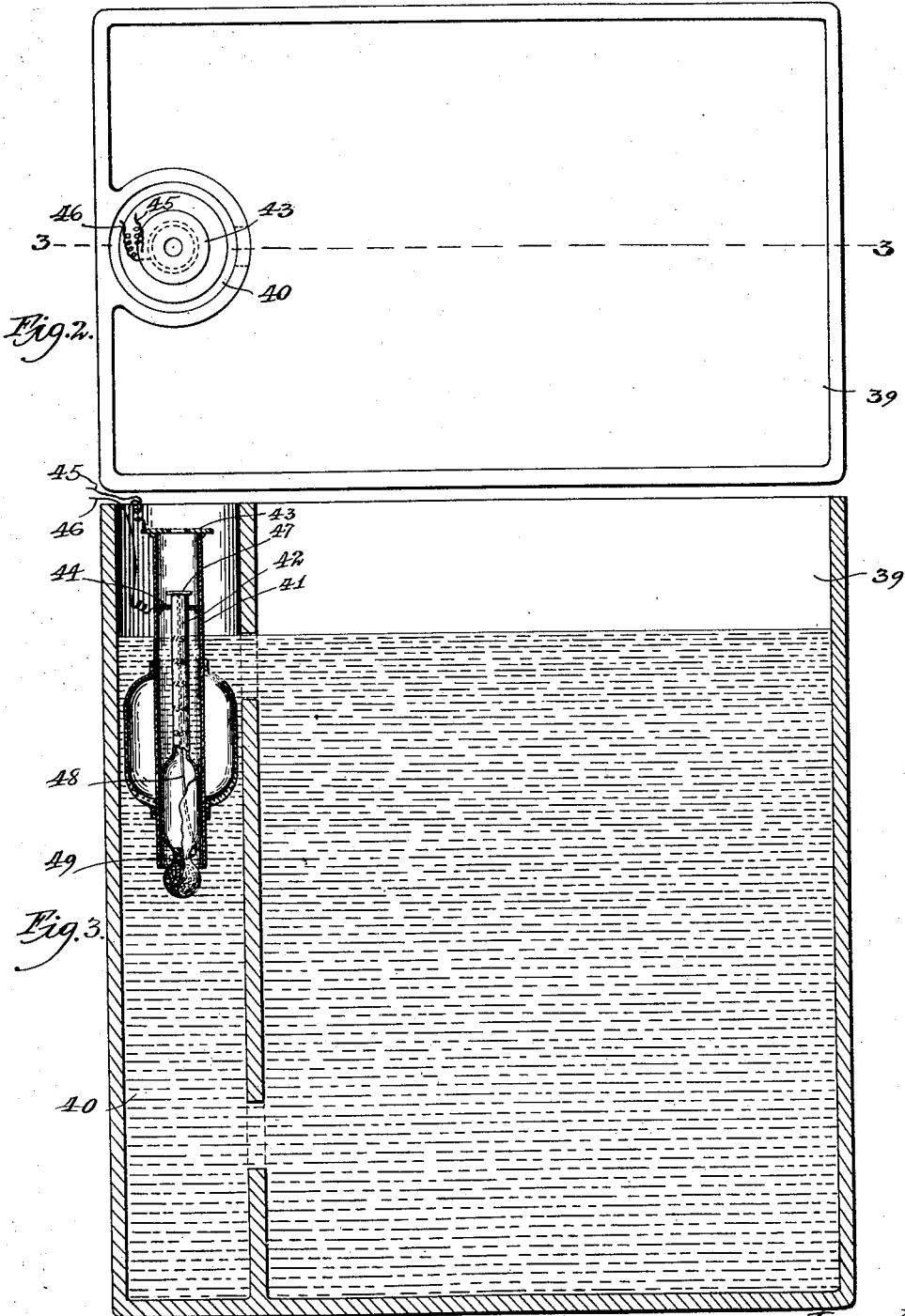

GUY E. DITZLER AND JOHN F. STENDER, OF CHICAGO, ILLINOIS, ASSIGNORS TO THE ADAMS & WESTLAKE COMPANY, OF CHICAGO, ILLINOIS, A CORPORATION OF ILLINOIS.

SYSTEM OF ELECTRICAL REGULATION.

1,284,616.  Specification of Letters Patent.  Patented Nov. 12, 1918.

Application filed August 12, 1915. Serial No. 45,137.

*To all whom it may concern:*

Be it known that we, GUY E. DITZLER and JOHN F. STENDER, citizens of the United States, and residents of Chicago, county of Cook, and State of Illinois, have invented certain new and useful Improvements in Systems of Electrical Regulation, of which the following is a specification and which are illustrated in the accompanying drawings, forming a part thereof.

The invention relates to means for regulating the current output of a variable speed electric generator when used in connection with a secondary battery for supplying current to a work circuit.

Such generators are used in car lighting systems, and are usually driven from the car axle, and hence their armature speed varies with the speed of the train. Such lighting systems involve the use of a secondary battery for supplying current to the lamps when the car is not in motion, and consequently the generator is at rest, or when the train velocity is not such as to produce an armature speed sufficient to generate a current of the required voltage. A generator is used in such systems which will have sufficient capacity to supply the lamp current and also, when necessary, recharge the battery. Automatic regulation of the generator must be effected to provide a constant current output at all train speeds to meet the demands on the line, and it is also important to so regulate the generator as to protect the secondary battery from overcharging.

The objects of the invention are to provide improved means for securing these results, and these objects are attained by the means as hereinafter described and as illustrated in the accompanying drawings, in which—

Fig. 2 is a plan view of one of the cells of the secondary battery; and

Fig. 3 is a sectional view on the line 3—3 of Fig. 2.

Figure 1:
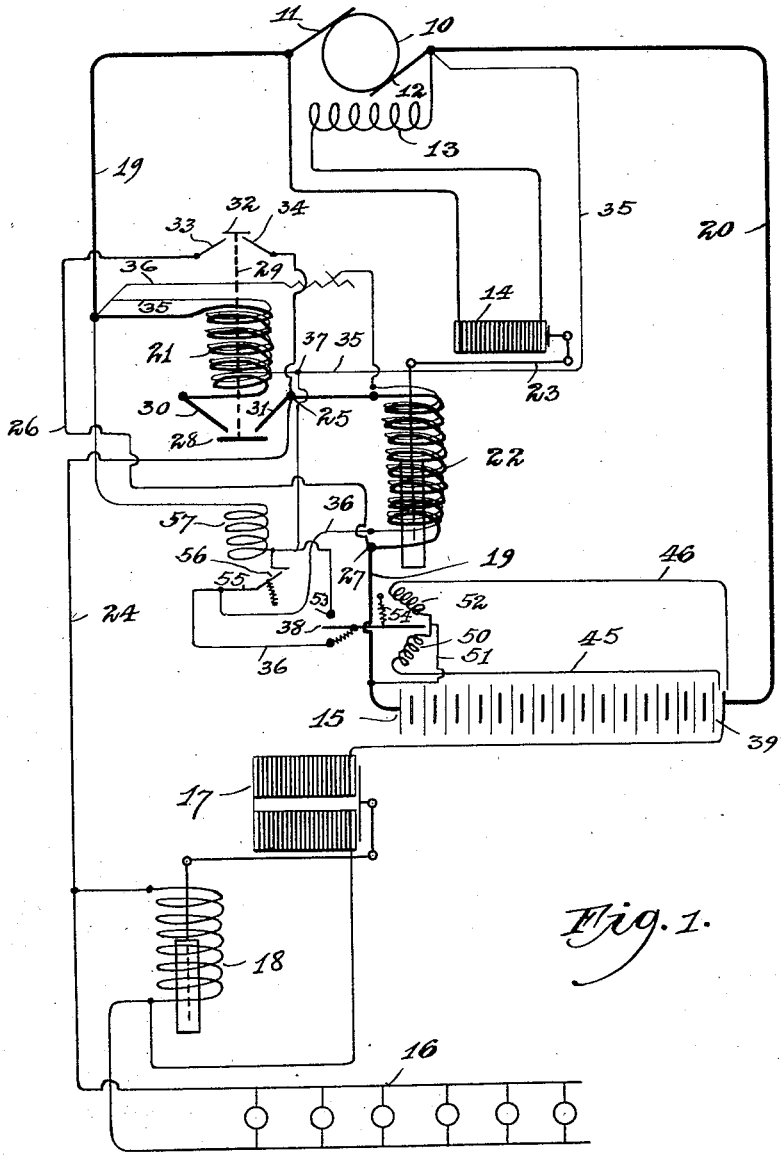
Figure 1 is a diagrammatic view of an electrical system.

A shunt wound dynamo is represented at 10, its brushes being indicated at 11, 12, and its field circuit at 13. Within the field circuit 13 there is incorporated a carbon pile variable resistance 14, of well known construction, whereby the strength of the field may be varied. This form of variable resistance devices comprises a plurality of carbon disks arranged in series, and offering more or less resistance to the current passed through them according to the degree of pressure applied for forcing them together.

The secondary battery is represented at 15, and the lamp circuit at 16. In connection with this latter circuit there is shown a voltage regulator 17 of the carbon pile type, controlled by means of a solenoid 18, the coil of which is in shunt from the lamp circuit.

The main leads 19, 20, of the generator are connected with the two poles of the battery 15, one of these lines, as 19, leading through the coil 21 of a solenoid controlling an automatic circuit breaker, and also through the coil 22 of a solenoid which acts upon the carbon pile 14 through a bell-crank lever 23. A line 24 leads from the line 19 at the junction point 25 directly to one side of the lamp circuit 16. A line 26 leads from the line 19 at the junction point 27 between the automatic circuit breaker and the battery to the line 24, being connected therewith, as shown, at the junction point 25.

The automatic circuit breaker comprises a contact plate 28, carried by the core 29 of the solenoid 21 and adapted to make contact with a pair of spring terminals 30, 31, in the line 19. The core 29 also carries a contact plate 32, coöperating with a pair of spring terminals 33, 34, in the line 26. A shunt line 35, connected between the lines 19, 20, also forms a part of the solenoid coil 21.

As thus far described the system is simply one embodiment of known forms of construction. The automatic circuit breaker in the line 19 is normally open, and that in the line 26 is normally closed, and the weight of the solenoid core may be depended upon for securing this position. Under such circumstances there is direct connection between the secondary battery 15 through the line 26 to the lamp circuit. When the generator armature is set in motion by the movement of the train, and acquires sufficient speed to deliver a current at a voltage exceeding that of the secondary battery, this current finds its only path initially through the line 35 until it develops sufficient magnetic strength in the solenoid 18 to close the line 19 and open the line 26. The generated current is now delivered both to the secondary battery and to the lamp circuit and, passing through the coil of the solenoid 21, supplements the action thereon of the current passing through the line 35 and holds the plate 28 firmly against the terminals 30, 31. The current in the line 19 also acts upon the solenoid 22 and effects the regulation of the generator by relieving the pressure upon the carbon pile 14, thereby increasing the resistance in the field circuit 13.

When the speed of the train decreases to such an extent that the potential of the generated current does not exceed that of the secondary battery, the flow of current through the main line winding of the solenoid 21 ceases and the current through the shunt line 35 is no longer of sufficient strength to support the solenoid core. The circuit breaker in the line 19 is thereupon opened and that in the line 26 closed, thus preventing the discharge of the battery through the generator and connecting it to the lamp circuit.

When the battery is fully charged it is desirable to prevent a further rise of the generator voltage and permit the battery to float on the line without receiving additional current. This is accomplished by closing a shunt line 36, which leads from the line 19, through the solenoid 22 to the shunt line 35 with which it is united at the junction point 37, the current flowing thence through the line 35 to the line 20. The line 36 includes a circuit breaker 38, which is responsive to the specific gravity of the electrolyte of the battery.

In Figs. 2 and 3 there is shown a pilot cell 39 of the secondary battery. This cell is provided with an alcove 40, within which there is housed a buoyant tube 41 loosely inclosing a float, here shown as an ordinary hydrometer 42. A metal contact plate 43 is mounted on the upper end of the tube, and a metal contact ring 44 is fitted therein some distance from its upper end but above the level of the electrolyte. From these contact plates, respectively, there lead wires 45, 46.

A metal contact plate 47 is mounted on the upper end of the hydrometer 42, and makes contact with the plate 43 when the specific gravity of the electrolyte is at the maximum, and with the contact ring 44 when it is below the maximum, or, if desired, at the minimum; i. e., contact is made with the plate 43 when the battery is fully charged and with the ring 44 when it is discharged wholly or partially. A wire 48 leads from the plate 47 downwardly through the chamber of the hydrometer, and projects through the wall thereof into the electrolyte, as shown at 49.

Referring to Fig. 1, the wire 45 leads from the pilot cell through the coil 50 of an electro-magnet to the line 51 connected with one of the battery terminals. The wire 46 leads from the pilot cell through the coil 52 of an electro-magnet to the line 51. The circuit breaker 38 constitutes an armature for the two electro-magnets, and is pivotally mounted to vibrate between their poles.

The two floating elements are so differentiated in specific gravity that when the battery is fully charged the contacts 43, 47, engage, closing the circuit through the lines 45, 51, 48, and the electrolyte. The electro-magnet 50 being thus energized, it attracts the lever 38, swinging it to the contact point 53 in the line 36. Thereupon current flows through this line and more strongly energizes the solenoid 22, drawing up its core and thus further reducing the pressure on the carbon pile 14 and weakening the generator field.

The circuit 36 will remain closed until the battery is sufficiently discharged to bring the contacts 47 and 44 into engagement by reason of the lowering of the specific gravity of the electrolyte. The extent to which the battery will be discharged before such engagement takes place can be determined by the location of the contact ring 44 in the tube. When the plate 47 comes into engagement with the contact ring 44 and the circuit 46 is closed, its magnet 52 swinging the circuit breaker 38 away from the contact 53 and opening the circuit 36, whereupon the recharging of the battery commences.

Should it be deemed desirable to maintain the battery at substantially full charge, the ring 44 should be placed very near the end of the tube, or there may be used in lieu of the switch-opening circuit, a spring 54 for retracting the switch upon the breaking of the contact between the plates 43, 47.

No effort has been made to indicate in the drawings the relative buoyancy of the tube 41 and hydrometer 42, it being assumed arbitrarily that the latter is of the lower specific gravity and hence will have the greater movement due to changes in the specific gravity of the electrolyte. It is obvious that if the outer float be the lighter the circuits 45 and 46 should be reversed as to their connection therewith, in order that the circuit breaker 38 shall be closed by the contact of the plates 44 and 47.

In order to prevent an undue rise in generator voltage should the secondary battery be cut off from the generator circuit, accidentally or otherwise, further provision is made for closing the circuit 36. To this end a cross line 55 is connected around the circuit breaker 38 and is provided with a normally open switch 56, controlled by a voltage relay 57 in shunt from the main line 19 to the line 36, and responsive only to a voltage somewhat above that of the fully charged battery.

We claim as our invention—

1. In a system of electric regulation, in combination, a generator, a secondary battery connected therewith, means for regulating the field of the generator, electro-magnetic means for controlling the regulating means, and a circuit breaker in a circuit of the electro-magnetic means, such circuit breaker comprising a pair of differential floats carried by the electrolyte of the battery.

2. In a system of electric regulation, in combination, a generator, a secondary battery connected therewith, means for regulating the generator field, a solenoid controlling the regulating means, the coil of the solenoid comprising a main line from the generator to the battery and a shunt line, and a circuit breaker in the shunt line, such circuit breaker comprising a pair of differential floats carried by the electrolyte of the battery.

3. In a system of electric regulation, in combination, a generator, a secondary battery, regulating means for the generator, electro-magnetic means for controlling the regulating means, a circuit breaker in the circuit of such controlling means, two electric circuits in series with the battery, electro-magnets in each of such circuits and acting oppositely on the circuit breaker, a floating tube in the electrolyte of the battery, such last-named circuits each having one end connected with the tube and at different elevations, and a float inclosed within the tube and differing therefrom in specific gravity and having a contact adapted to engage each of such connections and a lead therefrom submerged within the electrolyte.

4. In a system of electric regulation, in combination, a generator, a secondary battery, regulating means for the generator, electro-magnetic means for controlling the regulating means, a circuit breaker in the circuit of such controlling means, two electric circuits in series with the battery, electro-magnets in each of such circuits and acting oppositely on the circuit breaker, a float in the electrolyte of the battery, such last-named circuits each having one end connected with the float and at different elevations, and a second float having a contact adapted to engage each of such connections and a lead therefrom submerged within the electrolyte, such two floats differing in specific gravity.

5. In a system of electric regulation, in combination, a generator, a secondary battery, means for regulating the generator, two floats of different specific gravity within a cell of the battery, a circuit for controlling the generator regulating means and having one end connected with one pole of the battery and its other end with the heavier float, and a contact carried by the lighter float and adapted to engage the circuit terminal on the heavier float and a connection from such float submerged in the battery electrolyte.

6. In a system of electric regulation, in combination, a generator, a secondary battery, means for regulating the generator voltage, electro-magnetic means for controlling the regulating means, the line of the electro-magnetic means comprising two branches, one branch thereof being controlled by a float in the electrolyte of the battery and the other branch thereof being controlled by a voltage relay in shunt from the main generator line.

GUY E. DITZLER.
JOHN F. STENDER.